Figure 1:
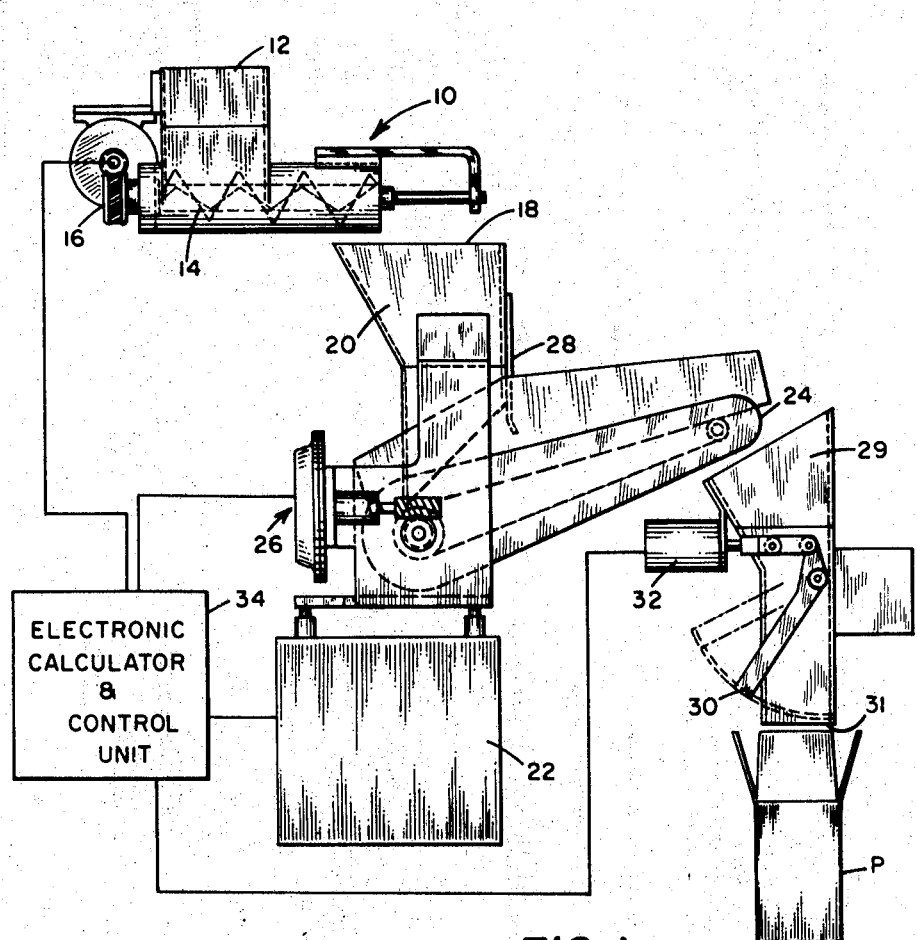

United States Patent

[11] 3,557,888

| [72] | Inventor | Adolf Stambera<br>Stuttgart-Bad Canstatt, Germany |
|---|---|---|
| [21] | Appl. No. | 702,327 |
| [22] | Filed | Feb. 1, 1968 |
| [45] | Patented | Jan. 26, 1971 |
| [73] | Assignee | Fr. Hesser Maschinenfabrik A.G.<br>Stuttgart-Bad, Cannstatt, West<br>Germany a corporation of West Germany |
| [32] | Priority | Feb. 4, 1967 |
| [33] | | Germany |
| [31] | | H-61,753 |

[54] METHOD FOR AUTOMATICALLY WEIGHING POURABLE GOODS
3 Claims, 2 Drawing Figs.

[52] U.S. Cl. .................................................. 177/1,
177/80, 177/82, 177/120, 177/114
[51] Int. Cl. ............................................... G01g 13/00
[50] Field of Search .......................................... 177/1, 55,
56, 62, 126, 114, 82, 70, 67, 71, 82, 119—121,
144

[56] References Cited
UNITED STATES PATENTS

| 600,040 | 3/1898 | Richards | 177/62 |
|---|---|---|---|
| 3,094,182 | 6/1963 | Garnett et al. | 177/1 |
| 3,254,728 | 6/1966 | Aquadro et al. | 177/70X |
| 3,425,501 | 2/1969 | Ganko | 177/70 |
| 474,777 | 5/1892 | Keith | 177/115 |
| 499,223 | 6/1893 | Gorringe | 177/115 |
| 536,334 | 3/1895 | Gorringe | 177/120X |
| 931,800 | 8/1909 | Reuther et al. | 177/120 |
| 2,675,120 | 4/1954 | Autenrieth et al. | 177/119X |
| 2,687,272 | 8/1954 | Schieser et al. | 177/121 |
| 2,701,703 | 2/1955 | Evers | 177/121 |
| 2,812,151 | 11/1957 | Mosher | 177/108 |
| 2,904,304 | 9/1959 | Zwoyer et al. | 177/108 |
| RE26,221 | 6/1967 | Soojian | 177/120 |

*Primary Examiner*—Richard B. Wilkinson
*Assistant Examiner*—George H. Miller, Jr.
*Attorney*—Edward E. Sachs

ABSTRACT: A dosaging machine is charged with a quantity of pourable goods which feeds an overload of the goods by means of a dosaging screw into a weighing receptacle. The overload quantity exceeds the desired, final predetermined quantity. The goods in the weighing container, which is placed on a scale, are weighed and discharged from the container into a receiving receptacle until the discharged quantity reaches the aforementioned predetermined weight. The operation is electronically controlled and uses a calculator for properly sequencing each step of the operation.

PATENTED JAN 26 1971    3,557,888

INVENTOR.
ADOLF STAMBERA

BY  *Edward I. Sachs*

ATTORNEY

METHOD FOR AUTOMATICALLY WEIGHING POURABLE GOODS

The invention relates to a method for automatically weighing pourable goods of a predetermined quantity, in equal amounts, and more particularly concerns the application of this method to high-capacity, automatic-weighing machinery.

In the prior art it is conventional, see for instance U.S. Pat. No. 600,040, to utilize a method wherein the weighing receptacle of a scale is charged with an overload, i.e., a load which exceeds the desired final load, and the surplus is gradually removed from the weighing container until the goods in the latter have been reduced to the predetermined weight. This type of system has been in common use and is preferred over a system in which the products to be automatically packed are charged into a weighing container until the weight has reached the predetermined level. The reason for this preference resides in the fact that the latter approach causes an afterstream which is difficult to control and which does affect the degree with which the weighing level can be accurately determined. Moreover, in order to overcome these disadvantages it has become necessary to employ special automatic tooling devices which, however, are not economical and impede the capacity of the system.

One of the problems encountered with the first-described system, note the U.S. patent, resides in the requirement that the excess material which has been removed from the weighing receptacle and placed into a temporary supply container must be returned again to the weighing receptacle for the next weighing sequence. As a result, it is entirely possible that certain portions of the products which are to be weighed may have to go through this cycle several times thus exposing the products to extra handling which, in many instances, is deleterious to the product and therefore undesirable. In addition, the necessity for conveying the material back and forth affects the capacity of the system and necessitates additional handling steps and accommodating stations.

In the method according to the present invention the number of steps required for handling the goods to be weighed is reduced and the need for returning products to the weighing container is eliminated. Moreover, in my new system problems with respect to the afterstream of goods cannot occur.

The aforementioned difficulties and problems are overcome by the present method in which a preweighed quantity of the products is placed into a weighing container, the weight constituting an overload, i.e., the final and desired weight is exceeded. The exact weight of this quantity within the weighing receptacle is then ascertained and the products are then continuously removed or discharged out of the weighing container until the discharged material has reached the predetermined weight. The receiving receptacle may be either the packaging container or some interim receptacle.

An aspect of the present invention resides in a method for automatically weighing pourable goods of a predetermined or final quantity. The method includes the steps of placing a quantity of the goods into a dosaging device and delivering an overload quantity of the goods from the dosaging device to a weighing receptacle. The aforementioned overload quantity exceeds the desired predetermined quantity. The goods in the weighing receptacle are then weighed and gradually discharged from the container into a receiving receptacle until the discharged quantity has reached a predetermined weight as ascertained by a scale and an electronic calculator.

It is therefore the primary object of this invention to overcome the difficulties experienced with methods used in the prior art.

It is a further object of this invention to eliminate the need for repeatedly discharging and returning the same products into the weighing receptacle.

It is a still further object of this invention to provide a weighing system in which the spillage occurring during the filling of the weighing receptacle is of no consequence and, as a result, the weighing accuracy at very high capacity is appreciably improved as compared to methods wherein such spillage occurs around automatic weighing equipment and upsets the accuracy of the system.

It is a further object of this invention to provide a method for automatically weighing pourable goods which is applicable for stationary as well as rotating automatic weighing equipment.

For a better understanding of the present invention, together with other and further objects thereof, reference is had to the following description taken in connection with the accompanying drawings, and its scope will be pointed out in the appended claims.

Figure 2:
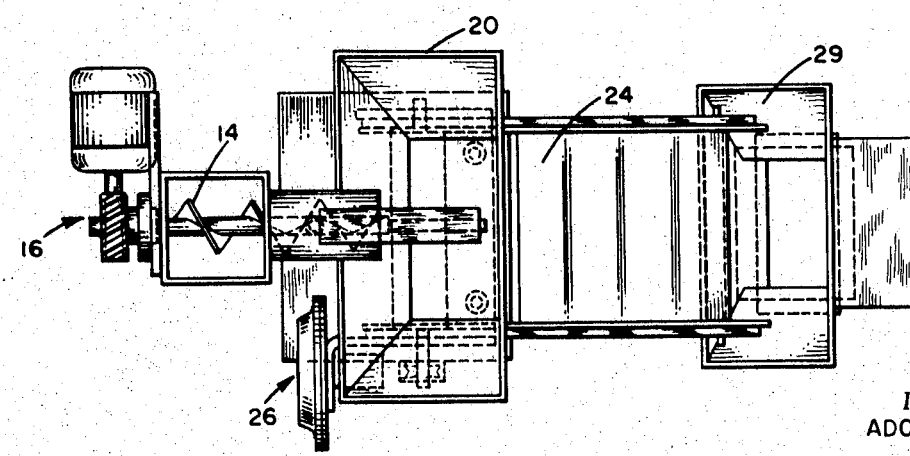

In the drawing:

FIG. 1 is a partly diagrammatic view and partly a side view of a weighing system in accordance with this invention; and FIG. 2 is a top view of the system shown in FIG. 1.

Referring now to the drawing there is shown a dosaging device 10 adapted for receiving in a hopper 12 thereof a quantity of products or goods which are to be weighed in equal amounts. For this purpose the dosaging device is equipped with a conveyor screw 14 driven by a suitable electric drive 16 for longitudinally advancing the products on a gradual basis until they are discharged into a feed opening 18 of a weighing receptacle 20. The weighing receptacle 20 is placed on a suitable scale 22 and intermediate to the bottom of the weighing receptacle 20 there is disposed an endless conveyor belt 24 which is electrically driven by conventional equipment 26. The conveyor 24 extends from weighing receptacle 20 outwardly and is thus adapted to discharge the goods stored within the weighing container. For practical purposes, the conveyor band is shown at an incline although such a position is not necessary for all applications. In order to control the layer of the products which are to be conveyed out of the weighing receptacle 20 on the belt 24, the weighing receptacle is equipped with a sliding gate 28 which extends generally perpendicular to the plane of the conveyor belt. The products, which are not shown in the drawing, are then discharged into a receiving receptacle 29 which is equipped at the lower end thereof with a door 30 which is actuated by an electromagnetic device 32 to discharge the goods, in proper sequence, into a package P or similar container.

In order to sequence the operation properly, as hereinafter further described, the electrical equipment or electrically actuated equipment, 16, 22, 26 and 32 is electrically connected to a sequence control unit which in turn is electrically connected to an electronic calculator 34.

In carrying out the invention, the products to be weighed are placed into the dosaging device 10 which, in turn, discharges a predetermined quantity into the weighing receptacle 20. This predetermined quantity is an overload quantity, that is to say, the total weight exceeds the weight desired for the final quantity which is to be placed into the packaging container P. The scale 22 which through the sequence control actuator 34 has terminated the discharge of the products from the dosaging device 10 now determines the exact weight of the products within the weighing receptacle 20 and electronically stores, in the known and conventional manner, this weight value of the goods in the receptacle 20. Thereafter, the sequence control unit 34 causes, through the electric drive 26, the conveyor belt 24 to be actuated which then conveys the goods from the receptacle 20 into the receiving container 29. It is of course possible to discharge the goods from the conveyor belt 24 directly into the package P without any intermediate steps. The conveyor band is caused to operate until the material removed from the weighing receptacle 20 has reached the desired and predetermined weight, i.e., that weight which the goods must have when placed into the package P. The conveyor belt 24 is electronically controlled by the sequence control unit which operates in conjunction with the scale 22 which is programmed through an electric calculator with the desired and the previous weight of the goods in the weighing receptacle 20. In accordance with conventional practice it is preferable that the sequence control unit causes the conveyor belt to slow down toward the end of the discharge step. With the material having been discharged into the receiving receptacle 29 the process has come to an end. The material within the container 29 now has the desired weight value and can now be discharged through opening 31 by means of electromagnetically operated gate 30 into the package P.

As already noted above, the method can be utilized for stationary equipment as well as for scales which are customarily used with high-capacity packaging machines of which usually a plurality are arranged on a rotating wheel.

It is of course obvious that various components of the equipment described above may be exchanged with other devices known in the art.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

I claim:

1. Method for automatically weighing pourable goods of a predetermined quantity, comprising the steps of: placing a quantity of said goods into a dosaging device; discharging an overload quantity of said goods from the latter device to a weighing receptacle, said overload quantity exceeding the desired predetermined weight quantity, determining the amount of excess; weighing the goods in said receptacle and continuously discharging said goods from the receptacle and into a receiving container until the discharged quantity has reached a predetermined weight and until the quantity remaining in the weighing receptacle equals the previously determined said amount of excess; with the quantity remaining in the weighing receptacle constituting the initial part of the overload quantity for the next cycle.

2. A method according to claim 1, wherein the operation of the dosaging device is sequenced by a sequence control unit associated with a scale off the weighing receptacle.

3. A method according to claim 2, wherein the operation of the device for discharging the goods out of said weighing receptacle is also sequenced by said sequence control unit and said scale.